United States Patent [19]
Gilbrech

[11] 3,712,426
[45] Jan. 23, 1973

[54] MAGNETIC FRICTION BRAKE
[76] Inventor: Donald A. Gilbrech, P.O. Box 628, Fayetteville, Ark. 72701
[22] Filed: Jan. 20, 1971
[21] Appl. No.: 108,066

[52] U.S. Cl..................................188/164, 335/299
[51] Int. Cl.............................................F16d 65/34
[58] Field of Search......188/158, 161, 163, 164, 171; 192/84 A; 335/299

[56] References Cited

UNITED STATES PATENTS 2,421,757    6/1947   Oetzel...................................188/164
3,244,944    4/1966   Birge..................................188/138 X
3,244,259    4/1966   Brede et al. ...........................188/138

Primary Examiner—Duane A. Reger
Attorney—Head & Johnson

[57] ABSTRACT

An electromagnetic brake includes a pair of spaced apart parallel E-shaped laminated electromagnetic bodies in the recesses of which there is disposed an exciter coil. The electromagnetic bodies and the coil are potted in plastic. The plastic forms a flat planar surface flush with the pole faces of the electromagnetic bodies to serve as a friction surface which brakes a friction disc keyed to a shaft to be braked.

4 Claims, 4 Drawing Figures

PATENTED JAN 23 1973

3,712,426

INVENTOR.
DONALD A. GILBRECH
BY
Head & Johnson
ATTORNEYS

MAGNETIC FRICTION BRAKE

BACKGROUND OF THE INVENTION

This invention relates to brakes and in particular to an improved electromagnetic brake.

The principle of electromagnetism has heretofore been used for stopping rotational movement. However these presently manufactured devices are not without shortcomings which deem them undesirable in certain applications. The main disadvantage of presently manufactured electromagnetic brakes is the fact that there is usually involved a toroidal braking configuration which as a practical matter does not permit the use of a laminated magnetic surface hence the eddy currents are opposed to the obtention of a minimal response time. A second disadvantage of the apparatus is that due to the normal configurations thereof the mounting and demounting of the component parts are fairly complicated operations; thereby increasing the costs of the machine.

It is therefore an object of this invention to present an apparatus to overcome the aforementioned disadvantages.

It is therefore still another object of this invention to present an electromagnetic braking apparatus having minimal components and which is relatively inexpensive to manufacture.

It is a third object of this invention to present an electromechanical brake utilizing two groups of magnetic laminations spaced apart to permit a shaft to pass through the coil assembly.

It is a fourth object of this invention to present an electromagnetic device wherein the coil is insulated from the magnetic laminations by means of potted plastic.

DETAILED DESCRIPTION OF THE DRAWINGS

FIG. 1 of the drawings is an overall view of the brake of this invention.

DETAILED DESCRIPTION OF THE PREFERRED EMBODIMENT

Figure 1:
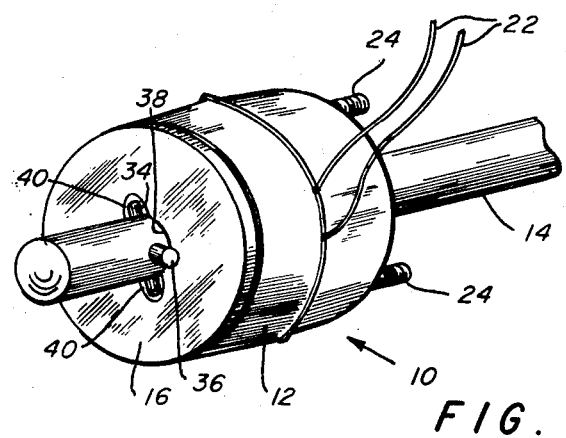

Looking now at FIG. 1 of the drawings, there is shown the magnetic brake 10 of this invention. The brake generally comprises a coil assembly 12 through which is rotatably journaled a shaft 14. Disposed on one end of shaft 14 adjacent coil assembly 12 is a magnetic sensitive disc 16. The opposite end of shaft 14 is interconnected to the object to be braked or controlled (not shown); such object may have a variety of configurations and in no way limits the scope of the invention. For example, the controlled object may be the intermittent feed advance of a paper web in a printing machine.

Figure 2:
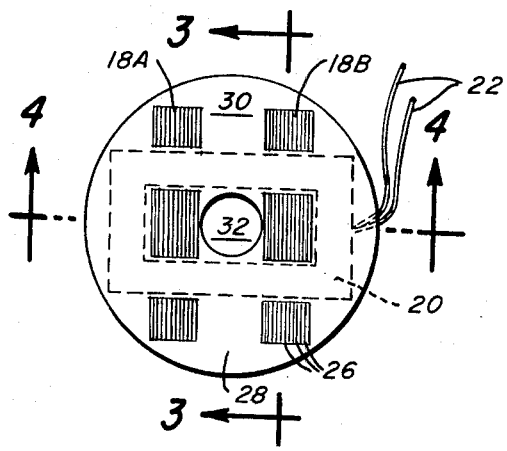
FIG. 2 is a top view of the invention.
Figure 3:
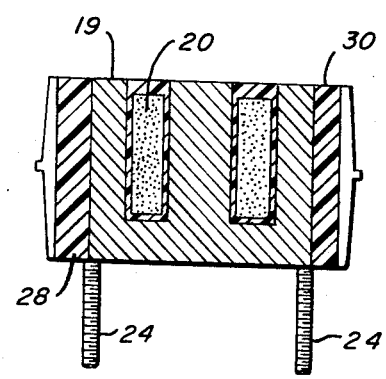
FIG. 3 is a cross-sectional view taken along lines 3—3 of FIG. 2.
Figure 4:
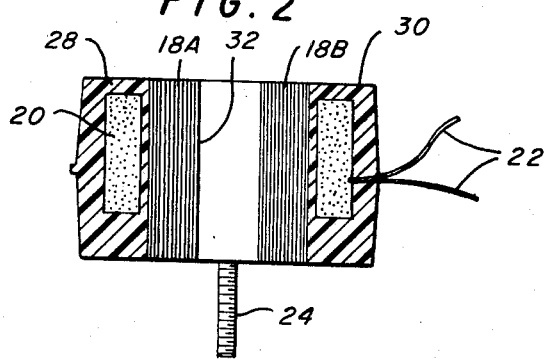
FIG. 4 is a cross-sectional view taken along lines 4—4 of FIG. 2.

Looking now at FIGS. 2, 3 and 4, coil assembly 12 includes spaced-apart E-shaped electromagnetic bodies 18A and 18B; each in turn being made of a plurality of magnetic laminations 26. The electromagnetic bodies have flat coplanar pole faces 19. Settled in the recesses of the E-shaped electromagnetic bodies is an exciter coil 20 which is electrically energized through conduits 22. Disposed in the rearward end of the device and projecting outwardly therefrom are parallel spaced-apart mounting screws 24.

With the exciter coil, electromagnetic bodies and mounting screws so disposed relative to each other a mandrel is centrally inserted between the electromagnetic bodies and within the run of the exciter coil and the entire assembly placed in a potting mold. A plastic insulating and potting compound 28 is then introduced into the mold and encapsulates the entire assembly. The potting compound is made flush with the pole faces of the electromagnetic bodies so that upon solidification a friction surface 30 is formed. Upon solidification the mold and the mandrel are removed to establish a transverse circular aperture 32 through the coil assembly. In addition to forming friction surface 30, the potting compound electrically insulates exciter coil 20 from electromagnetic bodies 18A and 18B.

Referring now back to FIG. 1, shaft 14 is rotatably journaled in aperture 32. Magnetic sensitive disc 16 which may be fabricated of soft steel is fastened to shaft 14 adjacent friction surface 30.

One method of fastening disc 16 to shaft 14 is by means of cross pins 34 and 36. The disc having a central hole 38 of a diameter slightly larger than that of the shaft is sleeved over the shaft. Cross pin 34 passes through shaft 14 and has the opposite ends thereof fitted in aligned notches 40 branching outwardly from central hole 38 so as to effect common rotation of disc 16 and shaft 14. Cross pin 36 passes through shaft 14 perpendicular to pin 34 and rearwardly thereof a distance substantially equal to the diameter of pin 34 so as to prevent axial movement of the disc along the shaft.

In operation, the coil assembly is mounted to a fixed support by means of mounting screw 24 and the shaft connected to the object to be controlled. Under normal operation shaft 14 rotates with disc 16 floating thereon close to friction surface 30. When exciter coil 20 is operably energized, electromagnetic bodies 18A and 18B attract disc 16 drawing same into contact with friction surface 30 to cause braking of shaft 14.

During the detailed description of the preferred embodiment, specific language has been used for the sake of clarity; however it is to be understood that the language are not words of limitations but include all equivalents which operate in a similar manner to accomplish a similar purpose. For example, the physical size of the components of the device is to be determined by the design requirements of each specific application and in no way limits the novelty of the invention.

What is claimed:

1. An electromagnetic brake for a rotatable shaft comprising:
    an exciter coil;
    an electromagnetic means having recesses for receiving said exciter coil and further having coplanar flat pole places; said electromagnetic means being in the form of a pair of magnetic bodies of generally E-shaped laminations, said exciter coil being in the recesses thereof;
    insulating material encapsulating said exciter coil and insulating same from said electromagnetic means; said insulating material effecting a flat friction surface substantially flush with said friction plane;

a magnetically sensitive friction disc fastened to said shaft and rotatably juxtaposed to said friction surface; and means for electrically energizing said exciter coil whereby the magnetic field of said body draws said disc onto said friction plane to brake said shaft.

2. A brake as in claim 1 wherein said insulating means is plastic compound potted around and onto said coil and electromagnetic bodies.

3. A brake as in claim 1 wherein said insulating material has a central axial opening through which said shaft passes.

4. A brake as in claim 1 wherein said disc is fastened to said shaft by means of cross pins.

* * * * *